Sept. 10, 1968    J. N. HARMAN, JR    3,400,896
FILM WINDER
Filed Feb. 23, 1967
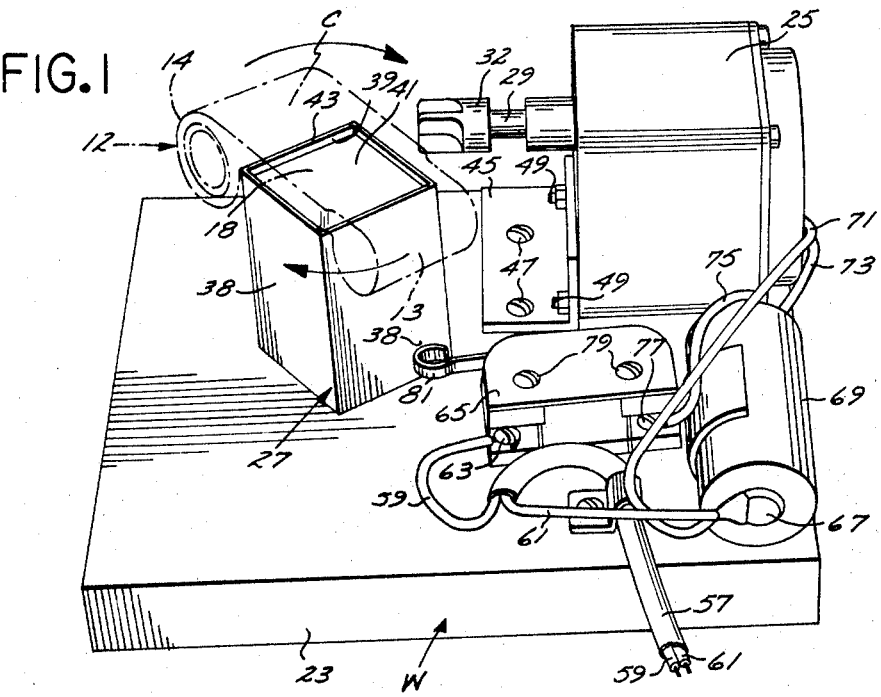
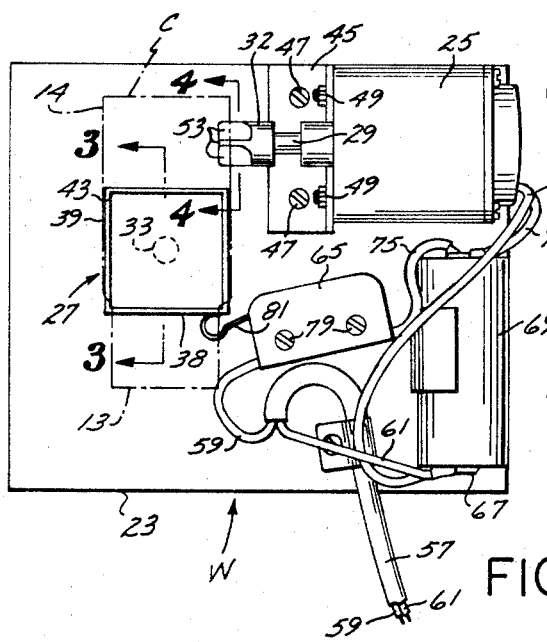
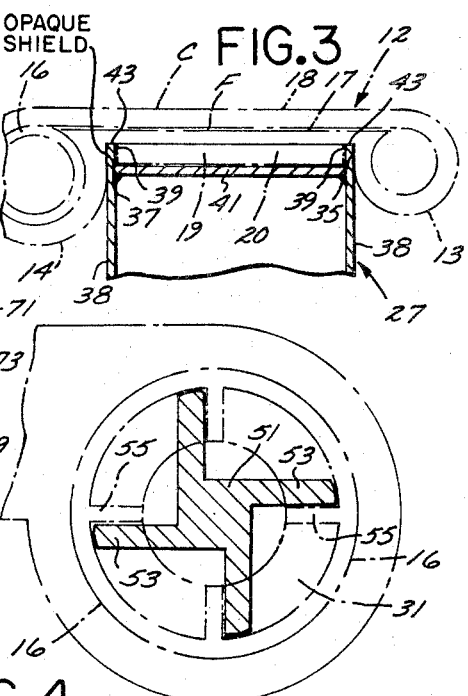
INVENTOR.
JOHN N. HARMAN JR.
BY Fulwider, Patton, Rieber,
Lee and Utecht
ATTORNEYS United States Patent Office  
3,400,896  
Patented Sept. 10, 1968

3,400,896
FILM WINDER
John N. Harman, Jr., La Canada, Calif., assignor to Drewry Photocolor Corporation, Burbank, Calif., a corporation of California
Filed Feb. 23, 1967, Ser. No. 618,177
5 Claims. (Cl. 242—71.6)

ABSTRACT OF THE DISCLOSURE

A film winder for winding film on the storage spool of a film cartridge of the type that includes a housing forming a feed chamber, a spool chamber and an intermediate portion defining a film path and having a through opening from one side of the film path which is framed by a projecting lip. The winder includes a base for supporting a winding means and a cartridge support. The cartridge mount is opaque and includes a projecting light shield for overfitting and cooperating with the lip framing the cartridge opening to shield the opening from the surrounding light.

BACKGROUND OF INVENTION

Field of invention

The present invention relates to a winding device for winding film on the storage spool included in a film cartridge.

Description of prior art

There are no known winders for accomplishing the film winding to which this invention is directed.

SUMMARY OF INVENTION

The cartridge type film, such as that used in the camera manufactured by Kodak and sold under the name Instamatic, has become very popular among photographers. Film cartridges of this type generally include a plastic housing having a film supply, or feed chamber on one end and a storage spool chamber on the other end. The supply chamber carries a coil of photographic film and protective paper and the storage chamber carries a storage spool, with the intermediate housing forming an interconnecting film path for passage of film from the supply chamber to the storage roll. The intermediate housing is open on one side of the film path and forms a protruding border that frames the opening.

Cartridges of this type have presented a problem for the film processors in that the photographer frequently fails to wind the entire film onto the storage spool before removing the cartridge from the camera. It is common practice among film processors to break the intermediate housing to gain access to the film for developing. To prevent tearing or other physical damage to the remaining portion of the film in partially-exposed cartridges, any film remaining in the feed chamber is pulled therefrom by winding the storage spool and is exposed to the surrounding light, resulting in that portion of the film having a fogged or dense appearance after developing. When such film is returned to the photographer, he may naturally assume that the processor exposed the otherwise good negatives causing the foggy appearance. Thus, it is desirable to wind the unused film on the storage spool while shielding it from the surrounding light as it passes through the film path and by the opening in the intermediate housing. Upon developing film handled in this manner that portion which was left on the feed chamber by the photographer will be unexposed and consequently blank and there will be no question but that the photographer never exposed that film.

Accordingly a main object of the present invention is to provide a film winder for rapidly and efficiently winding unexposed film from the feed chamber and onto the storage spool of a film cartridge of the type described while shielding the film passing the intermediate housing opening from the surrounding light.

Another object is to provide a film winder that starts and stops in response to the cartridge being moved into and from driving engagement with the winding means.

A more particular object of the present invention is to provide a film winder comprising a base that supports a winding means and a cartridge mount. The winding means includes a drive shaft and the cartridge mount is pivotable to move the end of the storage spool of a cartridge supported thereon into driving engagement with the drive shaft. An opaque rim protrudes from the mount and overfits the border framing the opening formed in the intermediate housing of a cartridge supported thereon.

A still further object of the present invention is to provide a film winder that is of simple construction, foolproof in operation, inexpensive to manufacture and operate, and that does not require a skilled operator.

Other objects and advantages of the present invention will become apparent from the following detailed description of a preferred embodiment thereof, when taken in conjunction with the appended drawings.

DESCRIPTION OF DRAWING

FIG. 1 is a perspective view of a preferred form of film winder embodying the present invention;

FIG. 2 is a top view of the film winder shown in FIG. 1, but on a small scale;

FIG. 3 is a partial horizontal sectional view in enarged scale taken along the line 3—3 of FIG. 2; and FIG. 4 is a partial horizontal sectional view in enlarged scale taken along the line 4—4 of FIG. 2.

DESCRIPTION OF PREFERRED EMBODIMENT

Referring to the drawings, the film cartridge C for which the film winder W of the present invention was developed, includes a housing 12 having offset feed chambers 13 and 14, respectively, on its opposite ends. The supply film is loosely rolled in the feed chamber 13 and a freely rotatable storage spool 16 is carried in the chamber 14 and film F is passed therebetween through a film path 17 defined by intermediate portion 18 of the housing 12. The intermediate portion 18 of the housing forms a downward-facing, as viewed in FIGURE 3, exposure opening 19 that is framed by a downward-projecting lip 20.

In the camera picture taking process the film F is reeled from the feed chamber 13 through the film path 17 and onto the storage spool 16 and, as noted earlier, in many instances the photographer will remove the cartridge C for developing while an unexposed portion of the film F is still extended into the feed or supply chamber 13. Obviously the increment of film disposed in the opening 19 will be exposed to the light and ruined, but the film remaining in the feed chamber 13 will remain unexposed. If the film F were merely wound onto the storage spool 16, the entire remaining unexposed length of film would be exposed. This is undesirable since when the developed film is returned to the photographer he will think that the processor accidentally exposed some good negatives. Accordingly, it is desirable to wind the film F from the feed chamber 13 and onto the storage spool 16 while shielding the opening 19 whereby solely the film frame initially disposed in the opening 19 will be rendered fogged in developing, while the remaining film length will be completely blank, thus indicating that it was never exposed.

The film winder W broadly comprises a rectangular base 23 for supporting a conventional electric motor 25 and a hollow cartridge mount generally designated 27. The motor 25 includes a horizontally extending drive shaft 29 for engaging the drive end 31 of the storage spool 16. The cartridge mount 27 is formed of sheet metal and is rotatable on a centrally located, vertically extending pivot rod 33. When the cartridge C is supported on the mount 27 and the mount rotated clockwise, as viewed in FIGURE 1, the drive end 31 of the storage spool 16 is moved into driving engagement with a drive fitting 32 keyed to the end of the drive shaft 29 whereby such spool is rotated to wind the unwound film thereon.

The horizontal cross section of the top of mount 27 complementarily interfits the facing sides 35 and 37 of the offset chambers 13 and 14, respectively. The sides 38 of mount 27 project upwardly beyond the top wall 41 thereof to form a light shield 39 having a top surface 43. Thus, when the cartridge C is supported on the mount 27, as shown in FIGURE 3, the light shield 39 surrounds the lip 20 and the shield's top surface 43 abuts the cartridge housing 12 to thereby seal the opening 19 from the surrounding light.

Base 23 is conveniently formed of aluminum plate and the motor 25 is affixed thereto by an angle 45. The angle 45 includes two vertical bores in its horizontal leg for accepting screws 47 that are screwed into threaded holes formed in the base 23, and two horizontal bores in the vertical leg for accepting studs 49 that extend from the motor 25.

The drive fitting 32 includes radially extending ribs 53 on its end for drivingly engaging webs 55 formed on the end of the storage spool 16. This engagement is shown clearly in FIGURE 4, wherein film cartridge appears in phantom.

Electric power is supplied to the motor 25 by an electric cable 57 that originates at an AC power source and comprises positive and negative leads 59 and 61, respectively. The positive lead 59 is connected with the positive terminal 63 of a normally open switch 65 and the negative lead 61 is connected with the negative terminal 67 of a starter capacitor 69. The starter capacitor 69 is wired in series with the motor 25 starter windings by positive and negative leads 71 and 73, respectively. The switch 65 is connected in series with the capacitor 69 by a lead 75 connected from its terminal 77. The switch 65 includes two vertical bores for accepting fastening screws 79 that are screwed into threaded holes in base 23. A switch actuating arm 81 is biased into the open position and extends into the rotational path of the mount 27. Thus, as shown in FIGURE 2, when the cartridge mount 27 is rotated clockwise from its original solid outline position to its dotted outline of this figure to move the storage spool 16 into engagement with the drive fitting 32, one of the side walls 38 of the mount 27 will be rotated abuttingly against the arm 81, as shown in FIGURE 4, and the switch 65 will be closed to supply power to the motor 25.

In utilizing the aforedescribed film winder W, electrical power is supplied to motor 25 through the cable 57. The film cartridge C is taken in the operator's hand and placed on the cartridge mount 27 with the top surface 43 of the light shield 39 abutting the under surface of the intermediate portion 18 of the cartridge housing thus shielding the exposure opening 19 from the surrounding light. The operator then rotates the cartridge C clockwise thereby urging the mount 27 to rotate on the pivot rod 33. This pivotal motion moves the end 31 of the storage spool 16 against the end of the drive fitting 32 and the webs 53 of the latter engage the spool ribs 55. Simultaneously with this engagement the pivotal motion of the mount 27 closes the switch 65 and the motor 25 is actuated. The resultant rotation of the drive shaft 29 rotates the storage spool 16 and any unwound film in the cartridge is wound on this spool.

From the foregoing it will be apparent that the film winder of the present invention provides an easy, efficient and rapid means for winding unwound film on the storage spool of a film cartridge. The efficiency effected by this device makes it feasible for the processor to wind all cartridges before breaking the cartridge housing and the danger of exposing unwound film will be eliminated.

Various modifications and changes may be made with regard to the foregoing detailed description without departing from the spirit of the invention or the scope of the following claims.

I claim:
1. A film winder for winding film on the storage spool included in a film cartridge of the type that include a housing forming a feed chamber, a storage spool chamber spaced therefrom, and having a rotatable storage spool therein, and an intermediate housing defining an interconnecting film path, said intermediate housing forming a through opening from one side of said film path, said opening being framed by a projecting lip, which winder comprises:
   a base;
   a storage spool winding means supported on said base and including a drive shaft;
   an opaque cartridge mount supported on said base and pivotable about an axis extending perpendicularly of said drive shaft axis to move the end of a mounted cartridge storage spool into winding engagement with said drive shaft, said mount including a projecting opaque light shield for overfitting said projecting lip and terminating in a flat edge for abutting said intermediate cartridge housing to shield the film passing said opening from the surrounding light.

2. A film winder as defined in claim 1 wherein said drive shaft extends horizontally and said cartridge mount is pivotable on a vertical axis.

3. A winder as defined in claim 1 wherein said winding means is an electric motor, said winder including electric wiring for providing electric power to said motor and further including a switch operably connected with said wiring and having an actuating arm biased in the open position and extending into the rotational path of said mount such that said mount abuts thereagainst and moves said arm into switch closing position when it is rotated to move the cartridge storage spool into winding engagement with said drive shaft.

4. A film winder as defined in claim 1 that is to be utilized to wind film on a cartridge storage spool that includes radially extending webs on the drive shaft engaging end and wherein said mount is arranged to move said storage spool abuttingly into axial alignment with said shaft including radially extending ribs for cooperatively engaging said spool webs.

5. A film winder as defined in claim 1 that is to be utilized with a film cartridge having said spool chambers offset to one side of said intermediate housing and forming facing external surfaces and wherein opposite sides of siad cartridge mount are spaced to complementarily interfit said facing surfaces.

References Cited

UNITED STATES PATENTS 2,140,445  12/1938  Mihalyi _____ 242—71.6

STANLEY N. GILREATH, *Primary Examiner.*

N. L. MINTZ, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,896

September 10, 1968

John N. Harman, Jr.

It is certified that error appears in the above identified patent and that said Letters Patent are hereby corrected as shown below:

Column 2, line 34, "FIG. 3 is apartial horizontal sectional view in enarged" should read -- FIG. 3 is a partial horizontal sectional view in enlarged --. Column 4, line 17, "include" should read -- includes --; line 55, "said shaft including radially extending ribs for coopera-" should read -- said drive shaft, said shaft including radially extending ribs for coopera- --.

Signed and sealed this 10th day of February 1970.

(SEAL)
Attest:

Edward M. Fletcher, Jr.
Attesting Officer

WILLIAM E. SCHUYLER, JR.
Commissioner of Patents